Patented Jan. 15, 1946

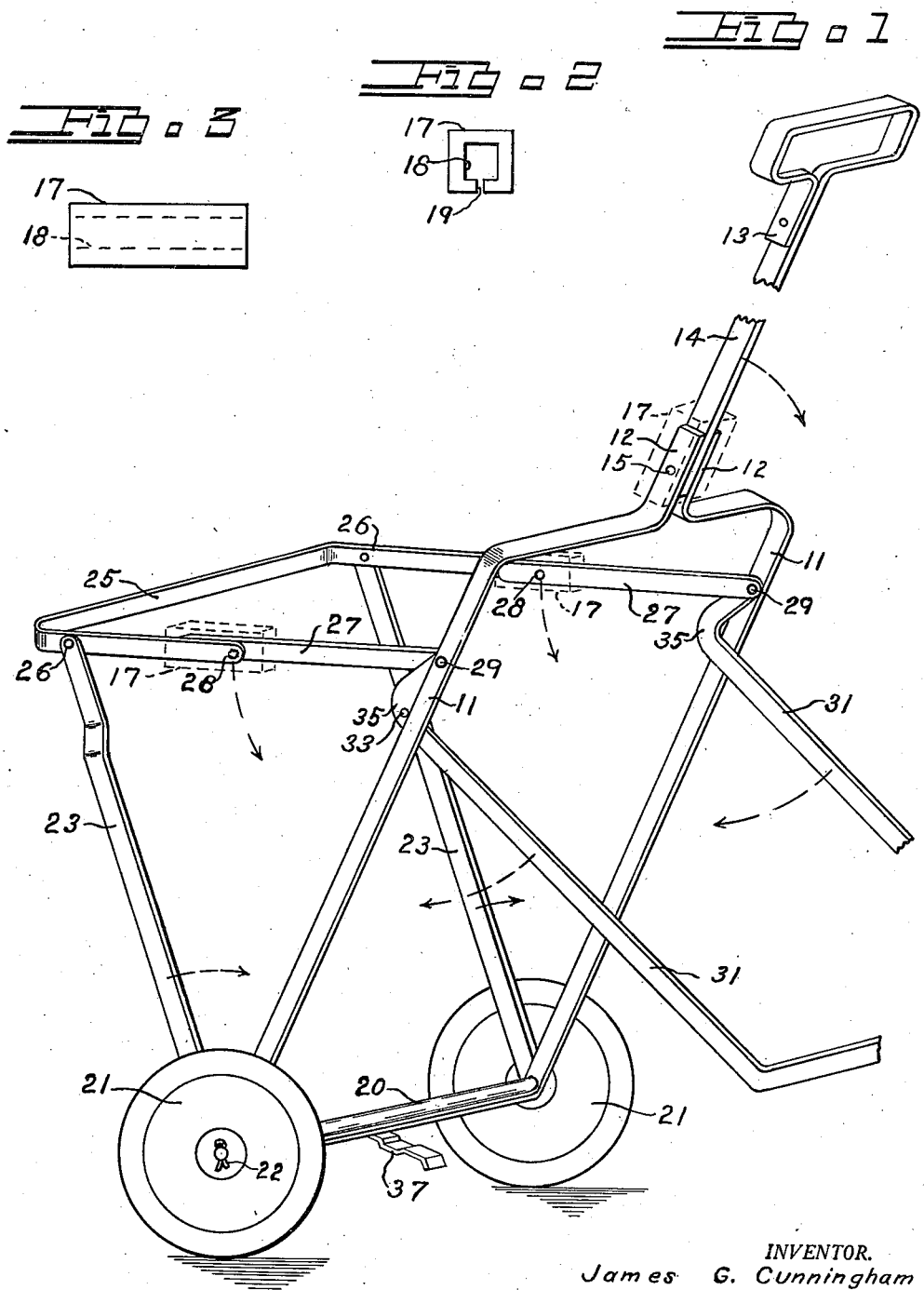

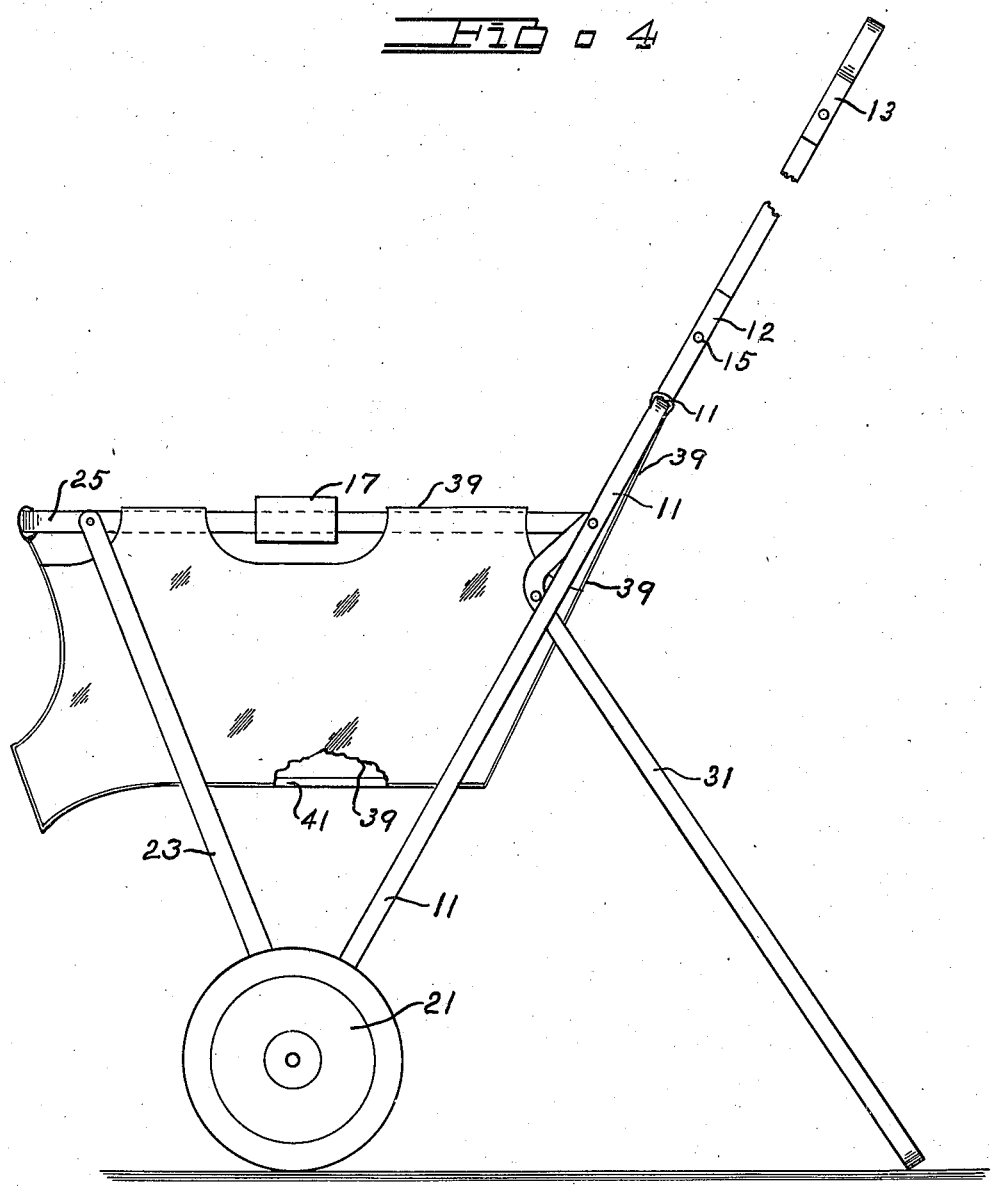

2,393,149

UNITED STATES PATENT OFFICE 2,393,149

CART

James G. Cunningham, Grosse Pointe Farms, and Robert A. Cunningham, Detroit, Mich.

Application December 4, 1944, Serial No. 566,544

6 Claims. (Cl. 280—36)

Our invention comprises a small, light-weight, manually operable, foldable and compact cart which may be used as a portable baby carriage, shopping cart or the like.

It is an object of our invention to provide an improved foldable, compact, portable cart which is of a simple light-weight construction convenient for manual use in folding, unfolding and operation.

It is also an object of our invention to provide an improved foldable light-weight two wheel cart which is convenient for manual operation and which may be safely stood in a loaded or unloaded condition.

It is a further object of our invention to provide such a foldable, compact, light-weight, cart which is of a construction simple to manufacture and assemble, and which requires a minimum amount of material.

Further objects and advantages are within the scope of the invention, such as relate to the arrangement, operation and function of the related elements of the structure, to various details of construction and to combinations of parts, economies of manufacture and numerous other features as will be apparent from a consideration of the specification in conjunction with the drawings disclosing specific embodiments of the invention, in which:

Fig. 1 is an oblique view showing the foldable cart frame opened, portions being broken away and dotted;

Figs. 2 and 3 are enlarged end and side elevational views respectively showing the sleeve fastener; and Fig. 4 is a side elevational view showing the cart with the frame opened for use and illustrating how one form of transportation basket may be mounted therein.

Referring more specifically to Fig. 1 of the drawings, we have shown the frame of our improved portable two-wheel cart as it is opened for use. It will be seen that the cart has a main frame 11 which is formed of a single elongated piece or strip of metal which is bent to a substantially rectangular shape with two end portions 12 bent up into an adjacent parallel relation in the middle of the top side of the main frame. A handle 13 is provided which is also formed of a suitably bent strip of metal 14 and its lower end is inserted between the two up-turned end portions 12 of the main frame wherein it is pivotally secured by any suitable fastening member 15, which may be a rivet, bolt, screw or like device. For use the handle is turned up to the position as shown, and for folding the cart to make it portable the handle is turned back into the main frame as indicated by the arrow. In use, a keeper 17 is slipped down over the up-turned end portions 12 and the handle to firmly hold these in aligned relation and when folded this keeper is merely slipped up onto the intermediate portion of the handle, as will be readily understood. As shown in Figs. 2 and 3, this keeper sleeve 17 may be made of a suitable piece of metal bent to enclose a suitable axial passage 18 for sliding snugly over the handle and the turned up ends 12 of the frame, and open at 19 along one side providing a desirable degree of resilience.

The lower ends of the side portions of the main frame 11 are suitably apertured to pass the ends of an axle 20 therethrough for projection axially therefrom. Suitable road wheels 21 are rotatively mounted upon the outer projecting ends of the axle whereon they are secured by any suitable fastening means, such as cotter pins 22. For this purpose any suitable road wheels 21 may be used, as commonly provided with small carts, baby carriages, and the like.

Two front bars 23 are provided and these are suitably apertured at the lower ends so that these ends are pivotally mounted on the lower portions of the sides of the main frame preferably by mounting upon the outer projecting ends of the axle 20 before the wheels are installed. A front frame 25 of a U-shape is provided and the sides thereof are secured pivotally to the upper ends of the front bars 23, as by fastening rivets 26. The ends of the side legs of the front frame 25 are pivotally secured to the ends of side bars 27 by rivets 28 and the other ends of the side bars are pivotally secured to the sides of the main frame by rivets 29, preferably at such points that the opened frame is substantially level, as shown in Fig. 1. By pushing down the pivotal joint 28, as represented by the arrows, the front frame 25 and the two connected front bars 23 may be folded back to the main frame, but when extended out for use, as shown, a resilient keeper 17 is snugly slipped over each of these joints 28 to hold the jointed members in rigidly aligned positions.

A stand or back prop 31 is provided which is of substantially a U-shape and the ends thereof are pivotally secured to the sides of the main frame so that this stand may be folded thereinto, as represented by the arrows, or it may be opened back to serve as a back prop, as shown.

The ends of the U-shaped back prop may be pivotally secured to the sides of the main frame by the same rivets 29, which also secure the folding side bars. To provide a limit stop 33 on each side for limiting the backward extension of the back prop 31, the upper ends thereof are preferably curved in loops 35 such that the limit stop pins 33 mounted therein and projecting outwardly are so positioned that the front edge of the main frame 11 is engaged thereby to properly position the prop when it is opened.

A resilient clip or retainer 37 is secured on the lower side of the main frame 11, as by riveting or welding, and it projects rearwardly so that it receives and holds the lower bar of the back prop when it is folded by turning it in, as indicated by the arrows.

Our compact light-weight two wheel cart is conveniently folded for transportation in automobiles, street cars, buses, trains and the like, and when it is opened for use it may be applied for various purposes of transportation, such as for a baby carriage, shopping cart and the like. Fig. 4 shows how a transportation basket of canvas, or other flexible material, may be conveniently attached and supported in the frame. For this purpose the canvas 39 may be suspended over the front bar of the front frame 25 and the upper side of the main frame 11, as by stitching the material around these members. A bottom or seat of ply-wood 41 may also be provided, which is conveniently turned up when the cart is folded, as will be readily understood.

It is apparent that within the scope of our invention modifications and different arrangements may be made other than herein disclosed, and the present disclosure is illustrative merely, the invention comprehending variations thereof.

What we claim is:

1. A light, portable, collapsible carrier comprising, a main frame of a single elongated piece of metal bent to a substantially rectangular shape with the two end portions bent up in an adjacent parallel relation in the middle of the top side of the frame, a handle having one end disposed between said bent end portions of the main frame, a fastener passed through said handle and bent end portions of the frame to secure these together with the handle pivotally adjustable, a sleeve slidable on said handle and over the bent end portions of the frame for securing the handle in a predetermined position, an axle of a length greater than the width of said main frame, apertures in the lower portions of the side pieces of said frame for receiving said axle passed therethrough with the ends projecting laterally, two wheels for the ends of said axle, a rear prop of a substantially U-shape, means pivotally securing the ends of said U-shaped prop to the respective side pieces of the main frame to be folded up to the frame for operation of the cart or to be opened back to serve as a stand, means limiting the backward pivotal movement of the prop relative to the main frame, and a foldable transportation frame secured on said main frame to be compactly collapsed thereon or to be extended forwardly from the main frame for use.

2. In combination in a light foldable two-wheel cart, a main frame of a substantially rectangular conformation, a handle on the upper portion of said frame, an axle passing through and projecting laterally from the lower portions of the side pieces of said frame, a pair of wheels, said wheels being rotatively disposed on the respective laterally projecting ends of said axle, a U-shaped front frame, two front bars, the lower ends of said front bars being pivotally secured on the respective outwardly projecting ends of said axle, means pivotally securing the upper ends of said front bars to the side pieces of said U-shaped front frame near the yoke thereof, a pair of folding bars, means pivotally securing one end of each of said folding bars to a respective one of the ends of said U-shaped front frame, means pivotally securing the other ends of said folding bars to the respective side pieces of the main frame at points such that when the front frame and the folding bars are in alignment these are substantially level when the cart is in use, and a pair of sleeves disposed for sliding over the respective joints of the folding bars and the front frame for holding these in alignment when extended forwardly for use as a transportation frame.

3. In a light portable two wheel carrier the combination of, a main frame of a single elongated piece of metal formed to a substantially rectangular shape with the two end portions bent up in an adjacent parallel relation in the middle of the top side of the frame, a handle having one end disposed between said bent end portions of the main frame, a fastener passed through said handle and bent end portions of the frame to secure these together with the handle pivotally adjustable, a sleeve slidable on said handle and over the bent end portions of the frame for securing the handle aligned therewith, an axle of a length greater than the width of said main frame, apertures in the lower portions of the side pieces of said frame for receiving said axle passed therethrough with the ends projecting laterally, two wheels for the ends of said axle, a rear prop member, means pivotally securing said prop member to the respective side pieces of the main frame to be folded up to the frame for operation of the cart or to be opened back to serve as a stand, means limiting the backward pivotal movement of the prop relative to the main frame, a U-shaped front frame, two front bars, the lower ends of said front bars being pivotally secured on the respective outwardly projecting ends of said axle, means pivotally securing the upper ends of said front bars to the side pieces of said U-shaped front frame near the yoke thereof, a pair of folding bars, means pivotally securing one end of each of said folding bars to a respective one of the ends of said U-shaped front frame, means pivotally securing the other ends of said folding bars to the respective side pieces of the main frame at points such that when the front frame and the folding bars are in alignment these are substantially level when the cart is in use, and a pair of sleeves disposed for sliding over the respective joints of the folding bars and the front frame for holding these in alignment when extended forwardly for use as a transportation frame.

4. A light, portable, collapsible carrier comprising, a main frame of substantially rectangular shape with two portions projecting up in an adjacent parallel relation in the middle of the top side of the frame, a handle having one end disposed between the upturned portions of the main frame, a fastener passed through said handle and said two upward portions of the frame to secure these together with the handle pivotally adjustable, means for securing the handle in a predetermined position relative to said frame, an axle of a length greater than the width of said main frame, apertures in the lower portions of the side pieces of said frame for receiving said axle passed therethrough with the ends projecting laterally, two wheels for the ends of said axle, a rear prop of a substantially U-shape, means pivotally securing the ends of said U-shaped prop to the respective side pieces of the main frame to be folded up to the frame for operation of the cart or to be opened back to serve as a stand, means limiting the backward pivotal movement of the prop relative to the main frame, and a foldable transportation frame secured on said main frame to be compactly collapsed thereon or to be extended forwardly from the main frame for use.

5. In a light, portable, two wheel carrier the combination of, a main frame of a substantially rectangular shape with two portions projecting up in an adjacent parallel relation in the middle of the top side of the frame, a handle having one end disposed between the two upwardly projecting portions of the main frame, a fastener passed through said handle and said two upwardly projecting portions of the frame to secure these together with the handle pivotally adjustable, means for securing the handle aligned therewith, an axle of a length greater than the width of said main frame, axle ends projecting laterally from the lower portions of the side pieces of said frame, two wheels for the ends of said axle, a rear prop member, means pivotally securing said prop member to the respective side pieces of the main frame to be folded up to the frame for operation of the cart or to be opened back to serve as a stand, means limiting the backward pivotal movement of the prop relative to the main frame, a U-shaped front frame, two front bars, the lower ends of said front bars being pivotally secured on the respective outwardly projecting axle ends, means pivotally securing the upper ends of said front bars to the side pieces of said U-shaped front frame near the yoke thereof, a pair of folding bars, means pivotally securing one end of each of said folding bars to a respective one of the ends of said U-shaped front frame, means pivotally securing the other ends of said folding bars to the respective side pieces of the main frame at points such that when the front frame and the folding bars are in alignment these are substantially level when the cart is in use, and a pair of sleeves disposed for sliding over the respective joints of the folding bars and the front frame for holding these in alignment when extended forwardly for use as a transportation frame.

6. A light foldable two-wheel cart comprising, a main frame of a substantially rectangular conformation, a handle on the upper portion of said frame, an axle passing through and projecting laterally from the lower portions of the side pieces of said frame, a pair of wheels, said wheels being rotatively disposed on the respective laterally projecting ends of said axle, a U-shaped front frame, two front bars, the lower ends of said front bars being pivotally secured on the respective outwardly projecting ends of said axle, means pivotally securing the upper ends of said front bars to the side pieces of said U-shaped front frame near the yoke thereof, a pair of folding bars, means pivotally securing one end of each of said folding bars to a respective one of the ends of said U-shaped front frame, means pivotally securing the other ends of said folding bars to the respective side pieces of the main frame at points such that when the front frame and the folding bars are in alignment these are substantially level when the cart is in use, means for holding the respective joints of the folding bars and the front frame in alignment when extended forwardly for use as a transportation frame, a foldable basket supported between said front frame and said main frame, and a prop secured to said main frame and extendible therebehind as a stand.

JAMES G. CUNNINGHAM.
ROBERT A. CUNNINGHAM.